United States Patent [19]

McCarthy

[11] Patent Number: 5,338,069
[45] Date of Patent: Aug. 16, 1994

[54] POSITIVELY-LOCKING, QUICK-RELEASE COUPLING

[75] Inventor: Daniel F. McCarthy, Beechhurst, N.Y.

[73] Assignee: Scully Signal Company, Wilmington, Mass.

[21] Appl. No.: 54,441

[22] Filed: Apr. 28, 1993

[51] Int. Cl.$^5$ ............................................. F16L 35/00
[52] U.S. Cl. ........................................ 285/38; 285/85; 285/312
[58] Field of Search ................ 285/84, 85, 312, 317, 285/91, 38

[56] References Cited

U.S. PATENT DOCUMENTS

| 767,843 | 8/1904 | Smith ............................. 285/85 |
| 3,124,374 | 3/1964 | Krapp ........................ 285/312 X |
| 3,976,313 | 8/1976 | Lauffenburger et al. ...... 285/312 X |
| 4,222,593 | 9/1980 | Lauffenburger et al. ............ 285/85 |

FOREIGN PATENT DOCUMENTS 648654  8/1937  Fed. Rep. of Germany ...... 285/312

*Primary Examiner*—Dave W. Arola
*Attorney, Agent, or Firm*—Cesari and McKenna

[57] ABSTRACT

A coupler has a locking mechanism which comprises a J-shaped blocking pin which is attached to a housing. A spring urges the blocking pin towards a locking arm so that a pin end traps the arm between the housing and the pin end to hold the arm in a locked position. The spring may be manually compressed to cause the pin end to move away from the arm so that the arm can swing outward to an unlocked position. The protruding pin end is bevelled and the locking arm has a bevelled portion which mates with the bevelled pin end. As the locking arm is swung to its locked position, the blocking pin end is pushed away from the arm allowing the arm to pass freely by the pin end. After the locking arm has passed over the pin end, the pin end is drawn toward the arm by the spring capturing the arm in the locked position.

15 Claims, 2 Drawing Sheets

POSITIVELY-LOCKING, QUICK-RELEASE COUPLING

FIELD OF INVENTION

This invention relates generally to couplings for hose and liquid pipelines.

BACKGROUND OF THE INVENTION

As is known in the prior art, many coupling devices have been manufactured and sold for connecting and disconnecting hoses containing pressurized fluid. In particular, it is well-known to have hollow male and female housings coupled together by a pair of pivoted locking arms located on the female housing, wherein the male housing is received by the female housing. The female housing has a pair of side openings which are situated to be opposite a groove in the outside of the male housing when the male housing is inserted into the female housing. A portion of the locking arm located near the pivot passes through the side opening and engages the peripheral groove of the male housing. A gasket forms a seal between the female housing and an end of the male housing.

In an unlocked position, each locking arm is free to swing outward away from and perpendicular to the longitudinal axis of the female housing, such that the portion of the locking arm passing through the side opening no longer engages the peripheral groove of the male housing. In a locked position, each locking arm is parallel to the longitudinal axis of the female housing such that the portion of the locking arm passing through the side opening engages the peripheral groove of the male housing.

While this configuration provides a satisfactory coupling mechanism, it suffers from the problem that the pivoted locking arm can be accidentally released. Even if the locking arm is only moved a small amount, the coupling may sufficiently loosen to allow a leak to form.

Consequently, several prior arrangements have been used to maintain the locking arms in a locked position. U.S. Pat. No. 3,124,374 discloses a coupler in which the rotation of the locking arm is prevented from springing outwardly into the unlocked position, as a result of the pressure of the fluid in the pressurized line, by a detent member which is under the bias of a spring so as to retain the locking arm in a locked position. The detent member protrudes from a side of a pair of ears attached to the female housing, near the end of the locking arms. A button, protruding from the top of one ear and the bottom of the other ear, permits the release of the locking arm when the button is pulled backwards such that the detent member no longer holds the locking arm in a locked position.

A problem with this embodiment is that the pair of detent structures are awkwardly arranged such that each locking arm must be unlocked separately by the operator using two hands. In addition, a problem sometimes arises when the coupling is dragged along the ground in that the button is biased backwards such that the detent member is moved out of the path of the locking arm and the locking arm is released. The result is a leak of the liquid from the pressurized line and possible injury to the operator.

In U.S. Pat. No. 3,976,313 each locking arm, when in the locked position, fits between a pair of top and bottom ears that project from the female housing. A spring loaded detent ball projects out of each pair of ears towards the locking arm, so that the locking arm is held in the locked position between the detent balls. Force must be applied to move the lever past these balls in order to release the coupling. A problem with this embodiment is that a relatively small force can pop the cam member free of the detent ball and permit unlocking of the coupling.

In U.S. Pat. No. 4,295,670, each locking arm is held in the locked position by a removable wire pin which engages an ear which passes through a slot in the locking arm. Inserting the pin into a hole in the ear thereby limits the outward movement of the locking arm. A problem with this embodiment and the wire pin is that this embodiment requires the use of two hands to lock the locking arm in the groove engaging position, one to hold the locking arm in the locked position and the other to insert the pin into the opening in the ear. This is compounded by the fact that often times the operator is wearing gloves which must be removed to complete the procedure, and the operator simply cannot be bothered to take off his gloves so the wire pins are not used. In addition, the pins are subject to being lost or sheared which results in the loss of the locking function.

SUMMARY

With the foregoing background in mind, it is an object of this invention to provide an improved coupler which incorporates a locking mechanism.

The foregoing object is accomplished and the foregoing problems are solved in one illustrative embodiment of the invention in which the coupler has a locking mechanism which comprises a blocking pin which is attached to the housing and extends in a direction parallel to the locking arm pivot line. A spring urges the blocking pin towards the locking arm so that the pin end traps the arm between the housing and a pin end to hold the arm in its locked position. The spring may be manually compressed to cause the pin end to move away from the arm so that the arm can swing outward to the unlocked position.

In one embodiment of the present invention, the pivot pins used to connect the locking arms to the housing are hollow and a part of the blocking pin passes through the hollow pivot pin.

In accordance with a further preferred embodiment, the blocking pins are "J"-shaped. The long leg of the "J"-shaped pin passes through the center of the pivot pin, and along an under side of a housing ear which holds the locking arm. The short leg of the "J"-shaped pin passes up through a hole in the housing ear such that in its locking position, the pin end protrudes from the ear thereby preventing the locking arm from swinging outward to the unlocked position.

In accordance with a further aspect of the present invention, the protruding pin end is bevelled and the locking arm has a bevelled portion which mates with the bevelled pin end. Therefore, as the locking arm is swung to its locked position, the blocking pin end is pushed away from the arm allowing the arm to pass freely by the pin end. After the locking arm has passed over the pin end, the pin end is drawn toward the arm by the spring capturing the arm in the locked position.

BRIEF DESCRIPTION OF THE DRAWINGS

The foregoing features of this invention, as well as the invention itself, may be more fully understood from the following brief description of the drawings in which.

DETAILED DESCRIPTION

The present invention will be more completely understood through the following detailed description which should be read in conjunction with the attached drawing in which similar reference numbers indicate similar structures.

Figure 1:
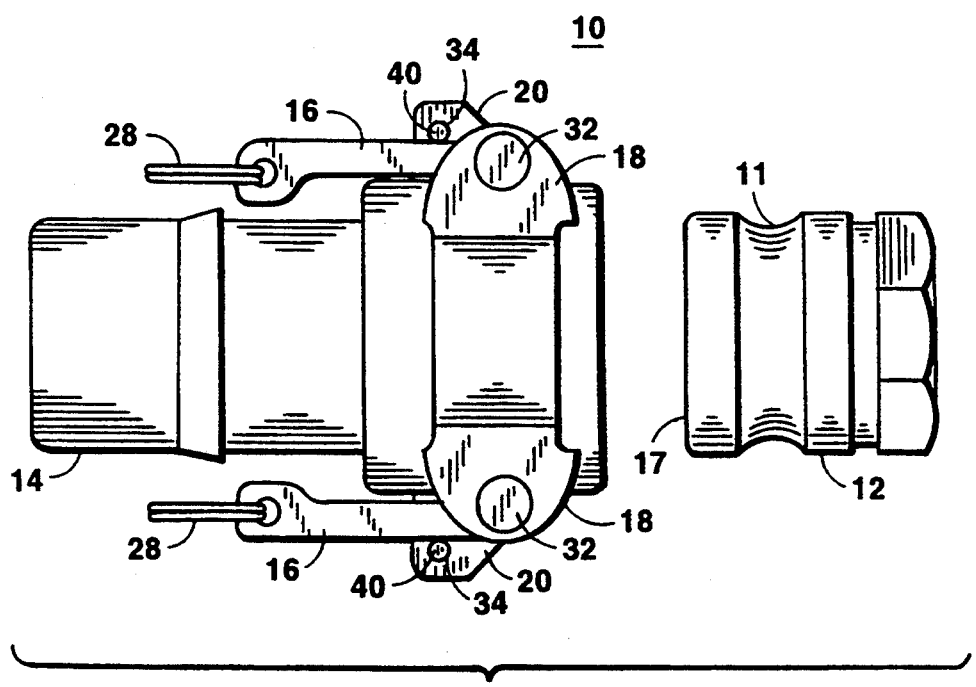
FIG. 1 is a top view of the male and female housings in accordance with the invention.
Figure 5:
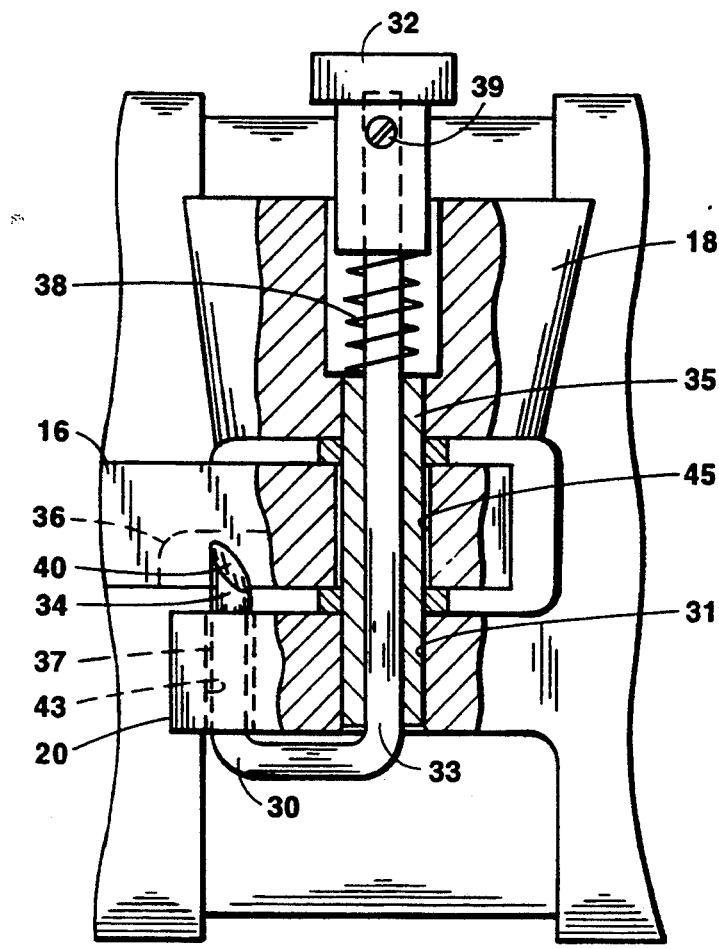
FIG. 5 is a partial cross-section view of the blocking pin and pivot pin arrangement taken along section lines 5—5 in FIG. 2.

Referring now to FIGS. 1 and 5, the coupler 10 has a hollow male housing 12 with a peripheral groove 11 that is received by the female housing 14.

The female housing 14 includes a pair of locking arms 16 which are pivotally connected to the female housing between a pair of top ears 18 and a pair of bottom ears 20. The locking arms 16 pivot about a hollow pivot pin 35 (shown in FIG. 5) which is press-fit into holes in each of top ear 18 and bottom ear 20 and which passes through a hole 45 (FIG. 5) in each locking arm 16. Each locking arm 16 has a free end 24 which can be swung to the locked position in which it is parallel to the longitudal axis of the female housing 14, (as shown in FIGS. 1 and 2) or alternatively can be swung to the unlocked position in which the arm 16 is perpendicular to the longitudal axis of the female housing 14.

Figure 2:
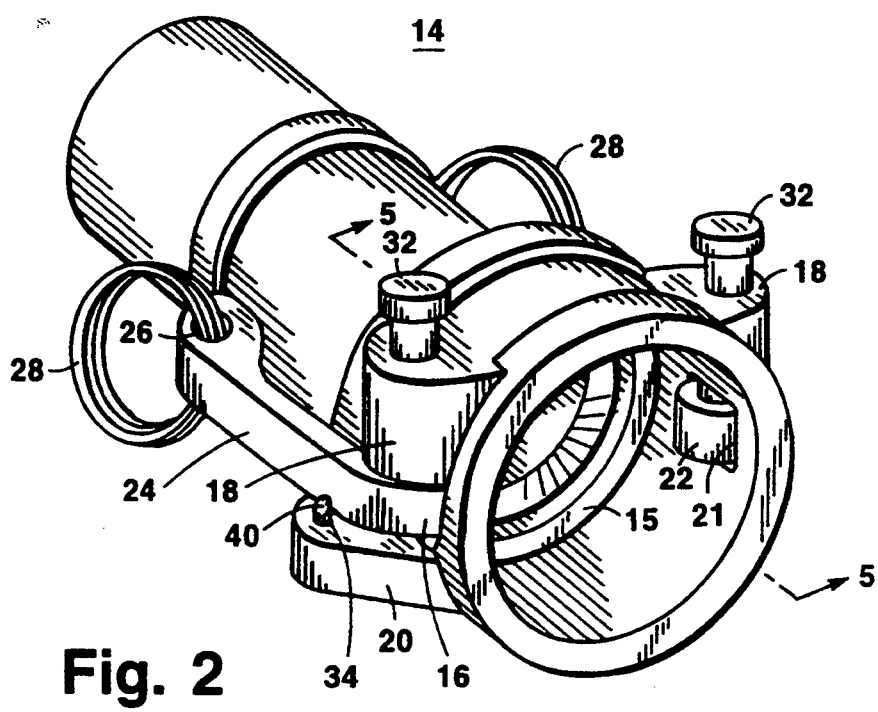
FIG. 2 is a horizontal view of the female housing of FIG. 1.

Referring to FIG. 2, the female member 4 includes a gasket 15 which forms a seal between the female housing 14 and the male housing 12. The female housing 14 also includes a pair of diametrically opposed slots 21. The slots 21 are located between the top 18 and bottom ears 20 and a cam portion 22 of the locking arm 16 passes through the slots 21 when the locking arm 16 is in the locked position. The cam portion 22 engages the peripheral groove 11 of the male housing 12 and forces an end 17 of the male housing 12 against the gasket 15.

Each free end 24 of the locking arm 16 includes hole 26 for receiving a multi-turn wire ring 28 for manipulating the locking arm between the locked and unlocked positions.

Referring now to FIG. 5, in accordance with one embodiment of this invention, a J-shaped blocking pin 30 is shown. The longer leg 33 of the pin 30 passes through the hollow center 31 of the pivot pin 35, which is press-fit into both of the top ear 18 and bottom ear 20 and which passes through a hole 45 in the locking arm 16 and along the under side of the bottom ear 20. The shorter leg 37 of the "J"-shaped pin passes through a second hole 43 in the bottom ear 20. In its locking position, the end 34 of the "J"-shaped pin protrudes out of bottom ear 20, thereby preventing locking arm 16 from swinging outward from the locked position.

The blocking pin 30 is biased by a spring 38, as best shown in FIG. 5, which is wound around the top of the J-shaped pin 30. The spring bears against a push button 32 which is connected to the pin 30 by any conventional means, for example, a set screw 39. When the push button 32 is in its normal (not depressed) position, spring 38 causes the end 34 of the "J"-shaped pin to protrude out of the bottom ear 20.

Figure 3:
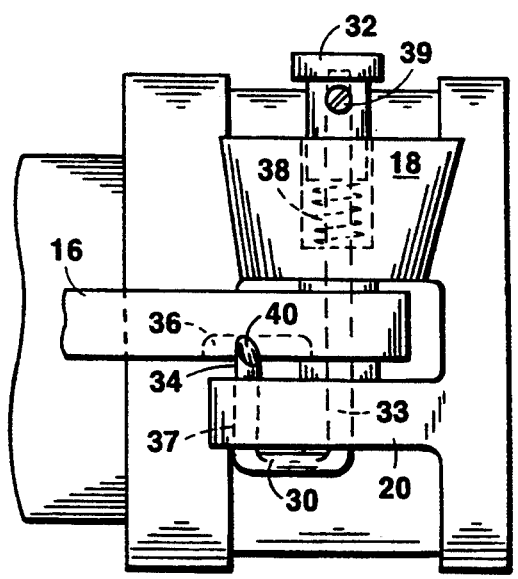
FIG. 3 is a side view of the female housing of FIG. 2 showing the "J"-shaped blocking pin in the locking position and the locking arm in the locked position.

Locking arm 16 includes a bevelled portion 36 on the side facing the pin end 34 as shown best in FIG. 3. Pin end 34 has a bevelled portion 40 which is situated to mate with the bevelled portion 36 of the locking arm 16 when the arm 16 is swung toward the locked position. The two bevelled surfaces interact to force the blocking pin end 34 to be forced down, against the bias of spring 38, which in turn allows the locking arm 16 to swing fully into the locked position. In particular, as the locking arm 16 passes over bevelled portion 40 of pin end 34, the bevelled portion 36 pushes the pin end 34 down such that the locking arm 16 slides over the pin end 40 to the locked position. Spring 38 then urges the pin end 34 back to its locked position and pin end 34 prevents the locking arm 16 from swinging outward to the unlocked position. In the locked position the locking arm is locked in a direction parallel to the horizontal axis of the female coupling housing 14 as best shown in FIG. 2.

Figure 4:
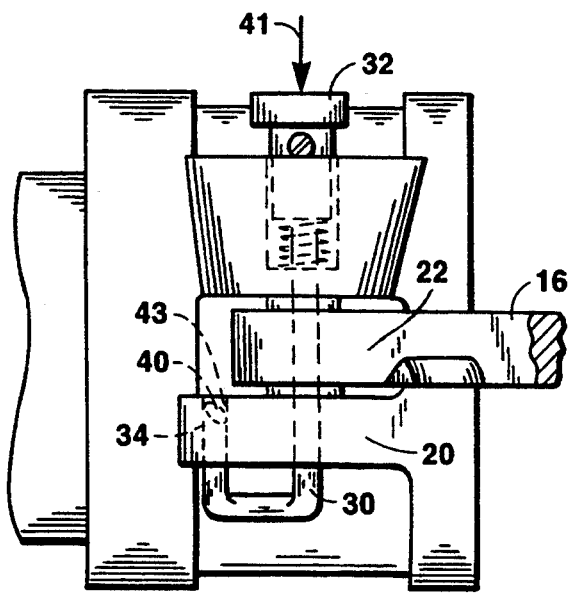
FIG. 4 is a side view of the female housing of FIG. 2 wherein the blocking pin is in a release position and the locking arm in the unlocked position.

Referring now to FIG. 4, when the push button 32 is depressed in the direction shown by arrow 41, the pin end 34 and bevelled portion 40 retract into hole 43 which allows the locking arm 16 to swing outward from the locked position to the unlocked position without resistance from the blocking pin end 34. The cam portion 22, as best shown in FIG. 2, then releases the male and female housings.

Having now described the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A locking mechanism for releasably securing a locking arm in a locked position relative to a first housing having detent securing means, which locking arm connects to the first housing by a pivoting connection and rotates about a pivot line adjacent the first housing such that, in the locked position, the locking arm secures the first housing to a second housing, the locking mechanism comprising:

a detent member having an end portion which extends in a direction parallel to the pivot line, and an actuating portion which is movably secured to the first housing by the detent securing means, a center line of the actuating portion being substantially colinear with the pivot line and lying within said pivoting connection;

a spring for urging the detent member towards the locking arm so that the end portion traps the arm between the first housing and the detent member; and means for manually compressing the spring to cause the detent member end portion to move away from the arm to release the arm so that the arm is allowed to swing outward away from the first housing.

2. A locking mechanism as claimed in claim 1 wherein the compressing means comprises a push button connected to the detent member such that when the push button is manually pressed, the spring is compressed.

3. A locking mechanism as claimed in claim 1 wherein the detent member end further includes a bevelled portion.

4. A locking mechanism as claimed in claim 3 wherein the locking arm further includes a bevelled portion on a side facing the detent member end and situated to mate with the bevelled portion of the detent member end, so that as the locking arm moves towards the housing, the bevelled portion engages the bevelled detent member end and forces the end away from the locking arm allowing the locking arm to pass over the detent member end.

5. A locking mechanism for releasably latching a rotating locking arm in a quick-release, positively-locking coupling, the coupling having a housing wherein the locking arm is attached to the housing by means of a hollow pivot pin attached to at least one-ear mounted on the housing, the locking mechanism comprising:
a J-shaped blocking pin having first and second parallel legs, the first leg extending through the hollow pivot pin and the second leg extending through the ear so that an end extends into the circular path of the arm;
a spring for urging the blocking pin towards the arm so that the end traps the locking arm between the housing and the second leg of the blocking pin; and
a means for manually compressing the spring to cause the second leg to move away from the arm to release the arm so that the locking arm is allowed to swing outward away from the housing.

6. A quick-release, positively-locking coupling as claimed in claim 5 wherein the blocking pin end further includes a bevelled portion.

7. A quick-release, positively-locking coupling as claimed in claim 6 wherein the locking arm further includes a bevelled portion on a side of the arm facing the blocking pin end and situated to mate with the bevelled portion of the blocking pin end, so that as the locking arm moves towards the housing, the bevelled portion engages the bevelled blocking pin end and forces the end away from the locking arm and towards the ear allowing the locking arm to pass over the blocking pin end as the locking arm moves towards the housing.

8. A quick-release, positively-locking coupling as claimed in claim 5 wherein the compressing means comprises a push button mounted on the blocking pin so that when the push button is manually pressed, the spring is compressed and the blocking pin end is moved away from the locking arm.

9. A quick-release, positively-locking coupling comprising:
a hollow male housing having an external peripheral groove;
a hollow female housing for receiving the male housing;
a pair of diametrically opposed side openings in the female housing which are situated to be opposite the peripheral groove in the male housing when the male housing is inserted into the female housing;
at least one top ear connected to the female housing above the opposed side opening;
at least one bottom ear connected to the female housing below the opposed side opening;
at least one locking arm having one end pivotally connected to the female housing between the top and bottom ears by means of a hollow pivot pin, and a second free end which rotates in a circular path;
at least one J-shaped blocking pin having first and second parallel legs, the first leg extending through the hollow pivot pin and the second leg passing through the bottom ear and having an end which extends into the circular path of the arm;
at least one spring for urging the pin end towards the arm so that the blocking pin end traps the locking arm between the housing and the blocking pin end; and
at least one means for manually compressing the spring to cause the blocking pin end to move away from the arm to release the arm so that the free end of the locking arm is allowed to swing outward away from the female housing.

10. A quick-release, positively-locking coupling as claimed in claim 9 wherein the blocking pin end further includes a bevelled portion.

11. A quick-release, positively-locking coupling as claimed in claim 10 wherein the locking arm further includes a bevelled portion on a side of the arm facing the blocking pin end and situated to mate with the bevelled portion of the blocking pin end, so that as the free end of the locking arm moves towards the female housing, the bevelled portion engages the bevelled blocking pin end and forces the pin end away from the locking arm and towards the bottom ear allowing the locking arm to pass over the bevelled pin end.

12. A quick-release, positively-locking coupling as claimed in claim 11 wherein the means for manually compressing the spring further comprises a push button mounted in the top ear and connected to the blocking pin such that when the push button is manually pressed, the spring is compressed and the blocking pin end is moved away from the locking arm.

13. A quick-release, positively-locking coupling as claimed in claim 12 wherein the locking arm further comprises a cam portion passing through one of the side openings for engaging the peripheral groove of the male housing when the free end of the locking arm handle is adjacent the female housing.

14. A quick-release, positively-locking coupling as claimed in claim 13 wherein said female housing further comprises a gasket which forms a seal between the male housing and the female housing when the cam portion engages the peripheral groove of the male housing.

15. A quick-release, positively-locking coupling as claimed in claim 14 wherein said locking arm further includes an opening, at the free end of the arm, for receiving a multi-turn wire ring for manipulating the locking arm.

* * * * *